No. 698,913. Patented Apr. 29, 1902.
W. C. EVANTS.
CULTIVATOR.
(Application filed Jan. 15, 1901.)
(No Model.)
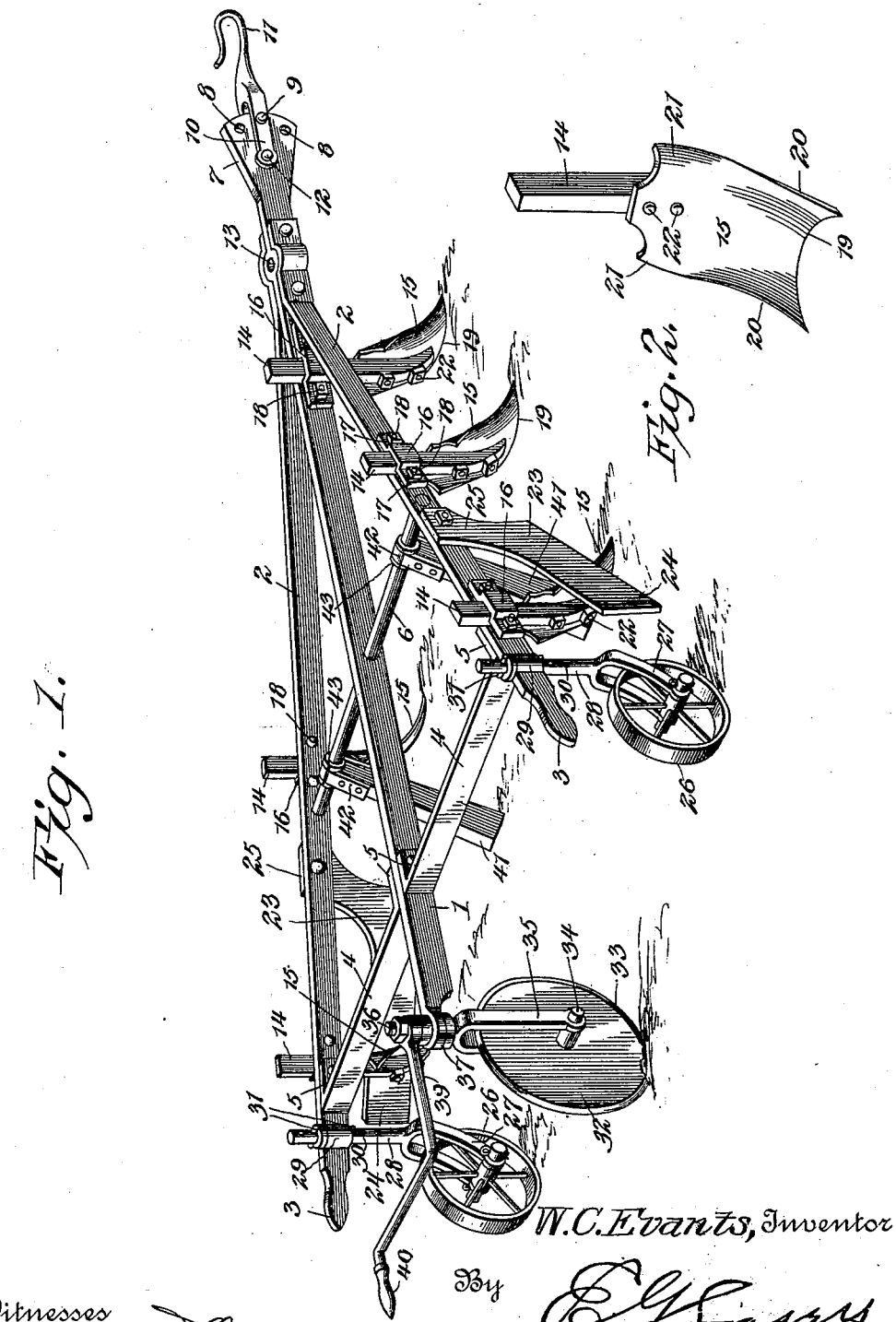
W. C. Evants, Inventor.
Witnesses

UNITED STATES PATENT OFFICE.

WILLIAM CLARK EVANTS, OF ANTIOCH, CALIFORNIA.

CULTIVATOR.

SPECIFICATION forming part of Letters Patent No. 698,913, dated April 29, 1902.

Application filed January 15, 1901. Serial No. 43,385. (No model.)

*To all whom it may concern:*

Be it known that I, WILLIAM CLARK EVANTS, a citizen of the United States, residing at Antioch, in the county of Contra Costa and State of California, have invented a new and useful Cultivator, of which the following is a specification.

This invention relates to cultivators, and has for its object to provide in connection with the machine a fender which is located upon the outer side of the outermost shovel and which acts to prevent injury to delicate plants by the overturning of dirt or large clods thereon and also to prevent the shovels from coming in contact with trees in orchards and elsewhere.

Another object of the invention is to provide a steering-wheel which is located at the rear of the machine and which is provided with a tiller whereby it may be turned for causing the machine to sheer to one side or the other, so that it may be brought into close relation to the trunks of trees or be thrown off the line of draft, so as to enable the machine to operate in close proximity to drills or rows of plants; also, to provide a steering-wheel which is adapted to penetrate the soil, and thereby obtain a more effective engagement therewith. The necessity for providing upwardly-projecting handles is thus done away with, and the machine is thereby adapted to be used in orchards and operated among trees with short trunks and low-hanging boughs. The steering-wheel by cutting into the soil also prevents the accidental sheering or swaying of the machine in either direction laterally, and thus causing inadvertent injury to plants, trees, &c.

These and other objects will appear more fully in the course of the ensuing description.

The invention consists in a cultivator embodying certain novel features and details of construction and arrangement of parts, as hereinafter fully described, illustrated in the drawings, and pointed out in the claims.

In the accompanying drawings, Figure 1 is a perspective view of a cultivator constructed in accordance with the present invention. Fig. 2 is a detail perspective view of one of the shovels.

The frame of the cultivator is substantially triangular in shape and comprises a main central bar 1 and side bars 2, which have their forward ends bolted or otherwise secured to opposite sides of the bar 1, said side bars diverging from their point of connection with the central bar rearwardly and provided at their rear extremities with lifting-handles 3. Adjacent to their rear ends the side bars 2 are connected by brace-bars 4, extending transversely of the machine-frame and having their opposite ends bent at an angle, as shown at 5, and firmly secured by any suitable fastening means to the central and side bars of the frame. The side bars are further connected by a cross bar or rod 6, arranged about centrally of the frame, said bar being preferably round, so as to form a fulcrum for a pair of supports hereinafter described.

A clevis-head 7 is located at the front end of the frame, said clevis-head being segmental in shape and provided with a plurality of openings 8 to receive a detachable pin 9, passing through registering openings in the fork 10 of the draft-hook 11. The extremities of the fork-arms of the hook are pivotally connected at 12 to the clevis-head, the pivot 12 being arranged at the same distance from each of the openings 8, thereby enabling the clevis or draft-hook to be rocked upward or downward and fastened at any desired angle with relation to the machine-frame. By this means the point of attachment of the draft-animals to the cultivator-frame may be raised or lowered, thereby regulating the depth of penetration of the shovels. The forward portion of the frame is also provided with a vertical opening 13, adapted to receive the shank of a supporting caster-wheel frame similar to those located at the rear of the machine and to be hereinafter more particularly described.

Connected adjustably to each side bar 2 is a series of standards 14, provided at their lower ends with cultivating-shovels 15. The standards are substantially square or rectangular in cross-section and are secured against the side bars by means of clamps 16, the central portion of each clamp being adapted to partially embrace the standard and having oppositely-projecting ears 17 to receive bolts 18, which pass therethrough and also through the side bar. The clamps 16 hold the standards 14 rigidly in place and at the same time provide for the vertical adjustment of the standards, which may be accomplished by loosening the bolts 18. The shovels 15 are similarly formed, being made from a substantially oblong piece of metal, and each is provided with a concaved lower portion which is dished from the front or active side of the shovel, as best illustrated in Fig. 2, thereby providing a concaved lower edge 19, which is sharpened to form a cutter for severing the roots and other undergrowth. By dishing the lower portion of the shovels in the manner described and illustrated the side edges 20 of the shovel are caused to project forward in advance of the central portion of the shovel-body, and such side edges are sharpened to form twin cutters, which also operate to sever and destroy weeds, roots, and undergrowth of all kinds. The upper portion of the shovel is dished in the opposite direction, or from the back, thus providing a convexed clearance-surface, as shown in Fig. 2, the side parts 21 of the upper portion of the shovel-body being deflected toward the rear, thus enabling the shovel to divide and clear itself from the upturned soil. The shovel is secured to its standard 14 by means of bolts 22 or in any approved manner. In order to properly center the forward shovel, it is preferably secured to the central cross-bar 1, as illustrated in Fig. 1 of the drawings.

Upon the outside of those shovels which are arranged the farthest from the center line of draft of the machine are arranged fenders 23, each comprising a substantially horizontal straight body portion 24 in the form of a plate, which is imperforate, and an attaching portion 25, which is bolted or otherwise secured to one of the side frame-bars. The body of the fender is disposed obliquely or at an angle to the line of draft of the machine and is located outside of the outermost shovel and serves a double purpose—namely, to prevent large clods of earth and heavy lumps of soil from being thrown over against young and tender plants to the injury of the latter and also to prevent the shovels from coming in contact with the trunks of trees in orchards and other places where the cultivator is being operated.

The rear end of the cultivator-frame is supported and carried by means of a pair of wheels 26, journaled in forks or frames 27, having vertically-disposed shanks 28, which pass through vertical bearings 29, adjacent to the rear ends of the side bars 2. Each shank 28 is provided with a longitudinal series of transverse openings 30, designed to receive a plurality of adjusting-pins 31, two of said pins being employed in connection with each shank 28 and arranged one above and the other beneath the bearing 29, so as to prevent vertical movement of the shank while allowing the free rotary movement thereof. By the means described the supporting-wheels 26 are adjustably connected with the machine-frame and may be set higher or lower by changing the adjusting-pins 31 from one set of holes to another.

At the center of the rear of the machine is arranged a steering-wheel 32. This wheel has its periphery sharpened and brought to a knife-edge 33, so that it may penetrate the soil and obtain a firm hold thereon. Said wheel is journaled on an axle 34, carried by a fork or frame 35, having a stem or shank 36, which is journaled in a vertical bearing 37 on the machine-frame and preferably carried by the rear extremity of the central frame-bar 1. Mounted on the upper end of the shank or stem 36 and non-rotatably engaging therewith is a tiller 39, extending rearwardly and also inclined upwardly and provided at its rear end with an operating-handle 40. By this means the operator may walk behind the cultivator and by manipulating the tiller may turn the steering-wheel 32 to one side or the other, and thereby cause the machine to sheer laterally to one side of the normal line of draft. This enables the operator to steer the machine up close to the trunks of trees or drills of plants of all kinds without directing the draft-animal to one side or the other. The steering-wheel also prevents the machine from accidentally sheering off to one side, so as to injure the plants or trees being cultivated. By omitting the usual upwardly-extending handles employed in this type of machine the improved cultivator may be readily driven under low-hanging boughs, thus adapting it particularly to the cultivation of orchards, &c.

Journaled upon the cross-bar 6 is a plurality of supports 41. These supports may be connected with the cross-bar 6 in any desired manner; but for convenience I have shown such cross-bars provided with metal straps 42, the ends of which are secured to the supports and the central portions of which partially encircle the rod or bar 6 and lie between positioning-collars 43, two of such collars being used for each swinging support, so as to prevent it from moving laterally in either direction. When it is necessary to clean the shovels or free the same from weeds and any other matter adhering thereto, all the operator has to do is to grasp the handles 3 and lift the rear end of the cultivator until the supports 41 swing downward by gravity into a vertical position, whereupon the shovels will be supported clear of the ground, thus facilitating the cleaning of the same. As soon as the draft-animals move forward the supports swing rearwardly and drop the cultivator-shovels into engagement with the ground, after which the supports 41 trail and drag along the surface of the ground in the manner illustrated in Fig. 1.

From the foregoing it is thought that the construction, operation, and many advantages of the herein-described cultivator will be readily apparent to those skilled in the art without further description, and it will be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. In combination with the triangular frame of the walking-cultivator, the draft appliances at the apex of the frame, the cultivator-shovels applied to the sides of the frame, the supporting-wheels at the rear end of each side of the frame, and the steering-wheel located at the rear end of the frame and arranged intermediate of the supporting-wheels, and consisting of a peripherally-sharpened rotary disk, and a hand-operated tiller connected rigidly to the steering-wheel frame and extending rearwardly therefrom.

2. In a cultivator, the combination with a triangular frame, cultivator-shovels located at opposite sides of the frame and fenders carried by the frame and disposed at the outer sides of the shovels and in close proximity to the ground, of a steering-wheel located at the rear end of the frame and having a sharpened periphery designed to enter the ground, means for shifting the position of the steering-wheel to guide the cultivator without necessity for tilting the latter, and supporting devices for the cultivator-frame, said devices being located at the rear end of the frame and at opposite sides of the steering-wheel, to prevent the tilting of the cultivator-frame, whereby the fenders are prevented from entering the ground, and the steering-wheel is prevented from penetrating the ground to more than a predetermined depth.

3. In a cultivator, the combination with a triangular frame, cultivator-shovels carried at the opposite sides thereof, and fenders secured to the opposite sides of the cultivator-frame in advance of the shovels, and extended obliquely beyond the outer sides of the shovels and in close proximity to the ground, of a steering-wheel located at the center of the rear end of the frame to guide the cultivator without necessitating tilting of the latter, said steering-wheel having a sharpened periphery designed to enter the ground, vertically-disposed shanks located at the opposite sides of the rear end of the frame, supporting-wheels carried by said shanks to prevent the tilting of the frame and the penetration of the ground by the fenders, said supporting-wheels also serving to limit the penetration of the ground by the steering-wheel, and means for shifting the steering-wheel to effect the steering of the cultivator.

In testimony that I claim the foregoing as my own I have hereto affixed my signature in the presence of two witnesses.

WILLIAM CLARK EVANTS.

Witnesses:
GEORGE JARADINE,
JOHN THOMAS.